United States Patent [19]
Matono et al.

[11] Patent Number: 6,078,702
[45] Date of Patent: Jun. 20, 2000

[54] IMAGE DISPLAY APPARATUS

[75] Inventors: Takaaki Matono, Yokohama; Tatsuo Nagata, Fujisawa; Takeshi Sakai, Yokahama; Koichi Sudo, Fujisawa, all of Japan

[73] Assignees: Hitachi, Ltd., Tokyo; Hitachi Video & Information Systems, Inc., Kanagawa-ken, Japan

[21] Appl. No.: 08/978,515

[22] Filed: Nov. 25, 1997

[51] Int. Cl.$^7$ ........................................ G06K 9/32
[52] U.S. Cl. ............................ 382/298; 348/445
[58] Field of Search ........................ 382/298, 299, 382/300; 348/445, 458; 345/439

[56] References Cited

U.S. PATENT DOCUMENTS

| | | | |
|---|---|---|---|
| 4,631,751 | 12/1986 | Anderson et al. | 382/298 |
| 5,521,614 | 5/1996 | Kotha et al. . | |
| 5,557,342 | 9/1996 | Eto et al. . | |
| 5,610,663 | 3/1997 | Nan et al. | 348/554 |
| 5,642,203 | 6/1997 | Sawano et al. | 382/298 |
| 5,654,735 | 8/1997 | Nakajima | 345/99 |
| 5,790,096 | 8/1998 | Hill, Jr. | 345/150 |
| 5,815,208 | 9/1998 | Samela et al. | 348/446 |
| 5,838,381 | 11/1998 | Kasahara et al. | 348/458 |

FOREIGN PATENT DOCUMENTS

| | | |
|---|---|---|
| 0 661 874 A1 | 7/1995 | European Pat. Off. . |
| 0 782 333 A2 | 7/1997 | European Pat. Off. . |
| A-6-276462 | 3/1993 | Japan . |

OTHER PUBLICATIONS

European Search Report dated Dec. 4, 1998.

*Primary Examiner*—Yon J. Couso
*Attorney, Agent, or Firm*—R. William Beard, Jr.; Frohwitter

[57] ABSTRACT

The present invention is concerned with image display apparatus capable of displaying the image of each of a television signal (TV signal) and an image signal (PC signal) from a personal computer. In addition, the present invention is to improve the performance of such apparatus, particularly to prevent the image from being deteriorated when the pixel number is converted, or changed to increase the pixel number of each of the TV signal and PC signal. In order to achieve this, the apparatus according to the invention has its pixel number conversion circuit provided with a plurality of conversion modes of different systems so that the pixel number conversion can be performed by properly switching the conversion modes in accordance with the type of the input image signal.

16 Claims, 3 Drawing Sheets

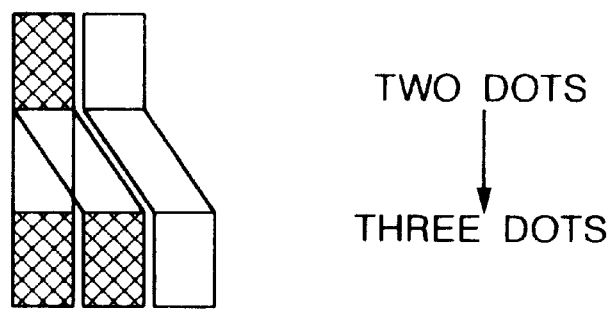
FIG. 3A
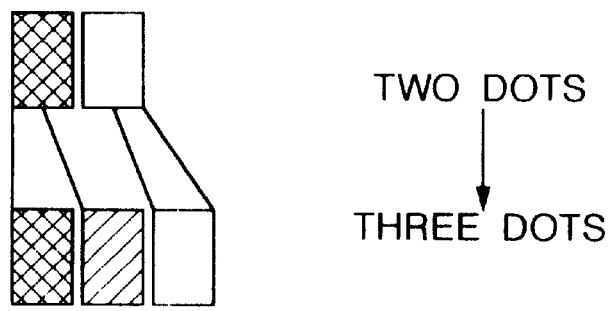
FIG. 3B
FIG. 4
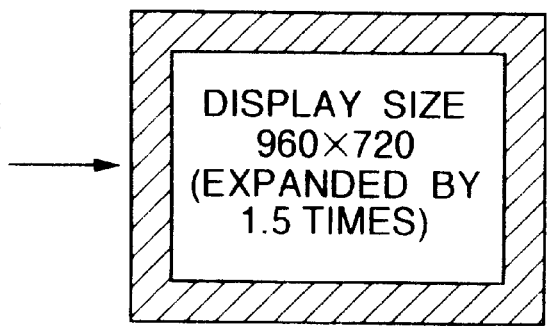

IMAGE DISPLAY APPARATUS

BACKGROUND OF THE INVENTION

The present invention generally relates to an image display apparatus, and particularly to an image display apparatus capable of displaying image information signals of a plurality of different types in personal computers and of television signals.

Recently, so-called multimedia type image display apparatuses have been widely getting attention which can display on the same screen image information signals of different types such as output signals with much letter information from personal computers (hereinafter, abbreviated "PC") and television signals with chiefly images. In addition, as disclosed in, for example, JP-A-6-276462, these image display apparatuses have often used displays of the flat panel type having fixed pixels in which liquid crystals or plasma are used.

These image display apparatuses often have a plurality of input terminals, for example, input terminals for the output signals from PC, and input terminals for ED (Extended Definition) TV signals. One of the image types of these input terminals is selected by a signal change-over circuit in response to the order or command from the user. The input image signal produced from this signal change-over circuit is identified in its type (PC signal or TV signal) by an input signal discrimination circuit. The input image signal of the type identified as above is converted in its pixels by a pixel conversion circuit to be suited for the number of pixels of the display screen in accordance with the result from the signal discrimination circuit. The pixel information is displayed on the display screen. The above input signal discrimination circuit discriminates the type of the input image signal on the input image signal on the basis of the horizontal synchronizing frequency and vertical synchronizing frequency fed in superposition on or separately from the input image signal. In addition, the pixel conversion circuit sets a conversion coefficient (magnification or reduction rate) according to the discrimination result from the input signal discrimination circuit, and carries out pixel conversion process for the input image signal by use of the conversion coefficient.

When a signal of 640×480 pixels (horizontal synchronizing frequency of about 31.5 kHz, vertical synchronizing frequency of about 60 Hz) corresponding to, for example, VGA mode is applied to the PC signal input terminal of the image display apparatus which has (1024×768) pixels corresponding to XGA mode, the input signal discrimination circuit recognizes the input image signal as a PC signal corresponding to VGA from the horizontal and vertical synchronizing frequencies. The pixel conversion circuit sets the horizontal and vertical conversion coefficients (magnifying coefficients) to be 1.5 times, respectively. Then, the input image signal is magnified, or expanded in the horizontal and vertical directions by 1.5 times by use of the conversion coefficients, thus converting the input signal into a signal of 960×720 pixels.

Thus, when the input image signal is magnified, or expanded, new pixels for interpolation are required to be created and inserted into the input image signal. As this system for producing and inserting the interpolating pixels, the following system is chiefly known. In the following system it is assumed, for example, that pixels are converted from 2 dots to 3 dots (1.5 times magnification). FIGS. 3A and 3B briefly show the idea.

(a) As a first system, a pixel having the same image information (luminance, chromaticity and so on) as a certain pixel is used for the interpolation to be inserted adjacent to the certain pixel (see FIG. 3A).

(b) As a second system, the image information of two adjacent pixels are averaged into a pixel for the interpolation to be inserted between the two adjacent pixels (see FIG. 3B).

SUMMARY OF THE INVENTION

In the above conventional systems, the signal fed to the EDTV signal input terminal has its horizontal synchronizing frequency twice larger than the normal NTSC signal, or about 31.5 kHz, and its vertical synchronizing frequency of about 60 Hz. In other words, since the EDTV signal is the same format as the PC signal corresponding to the VGA mode fed from the PC signal input terminal, the input signal discriminating circuit recognizes the EDTV signal as the same signal as the VGA signal. Therefore, the pixel conversion circuit changes the pixel number so that the number of pixels of the EDTV signal is expanded or increased by 1.5 times as described above. The pixel conversion system is fixed to any one of the two systems mentioned above.

When the first system of the image conversion systems is applied to the PC signal with chiefly much letter information, the outlines of the letters or characters can be sharply displayed with no blur in the outlines or contour of the letters or characters. However, if it is applied to the EDTV signal which is chiefly for natural pictures, the outlines of an object become serrate, and thus the pictures are unnatural.

Conversely, when the second system is applied to the PC signal with chiefly much letter information, the outlines of the letters become dim or blurred. If however it is applied to the EDTV with chiefly natural images, natural pictures can be obtained.

Thus, in the conventional image display apparatus, since the image conversion system used is fixed to either first or second system, the apparatus using only the first system has the drawback that it is difficult to display the EDTV signal image naturally, or clearly, and the apparatus using only the second system has the disadvantage that it is difficult to display the letter information of the PC signal or the like clearly, or definitely.

Accordingly, in view of the above problems, it is an object of the invention to provide an image display apparatus for magnifying and displaying a plurality of different types of image signals, which is capable of displaying expanded images with high quality by performing a magnification process suited for a plurality of different types of the input image signals.

In order to achieve the above object, according to one aspect of the present invention, the pixel conversion means is provided with the first conversion mode and the second conversion mode, which are selectively switched in accordance with the result from the input signal discrimination means, thereby converting the input image signal by the selected conversion mode. In the first conversion mode, a pixel having the same image information as a certain pixel is inserted as an interpolation image to be adjacent to the certain pixel. In the second conversion mode, the image information of two adjacent pixels are averaged and used as a pixel for interpolation to be inserted between the two adjacent pixels. More specifically, when the input image signal is a PC signal, it is converted by the first conversion mode, and when the input image signal is a television signal, it is converted by the second conversion mode. Thus, both the image information signal from a PC and the television signal can be displayed with high quality by the appropriate conversion systems.

In addition, another signal conversion means may also be provided which converts the image information signal fed from an input terminal into a signal format equivalent to the image information signal fed from the other input signal. Therefore, there is no need to provide a plurality of conversion coefficients (magnification coefficients) in the image conversion means, thus making it possible that the image conversion means can be simplified in its construction.

The above signal conversion means may be one in which a television signal of a standard television system is converted into the VGA signal format. With the arrangement, the standard-television system television signal can be converted into the VGA signal format, thereby making it unnecessary for the pixel conversion means to have conversion coefficients (magnification coefficients) suitable for the standard television system, thereby simplifying the pixel conversion means in its construction.

BRIEF DESCRIPTION OF THE DRAWINGS

FIGS. 3A and 3B are schematic diagrams to which reference is made in explaining the pixel conversion systems used in the invention.

FIG. 4 is a schematic diagram to which reference is made in explaining the expanded pixels according to the invention.

DESCRIPTION OF THE PREFERRED EMBODIMENTS

Embodiments of the invention will be described in detail with reference to the accompanying drawings.

[Embodiment 1]

Figure 1:
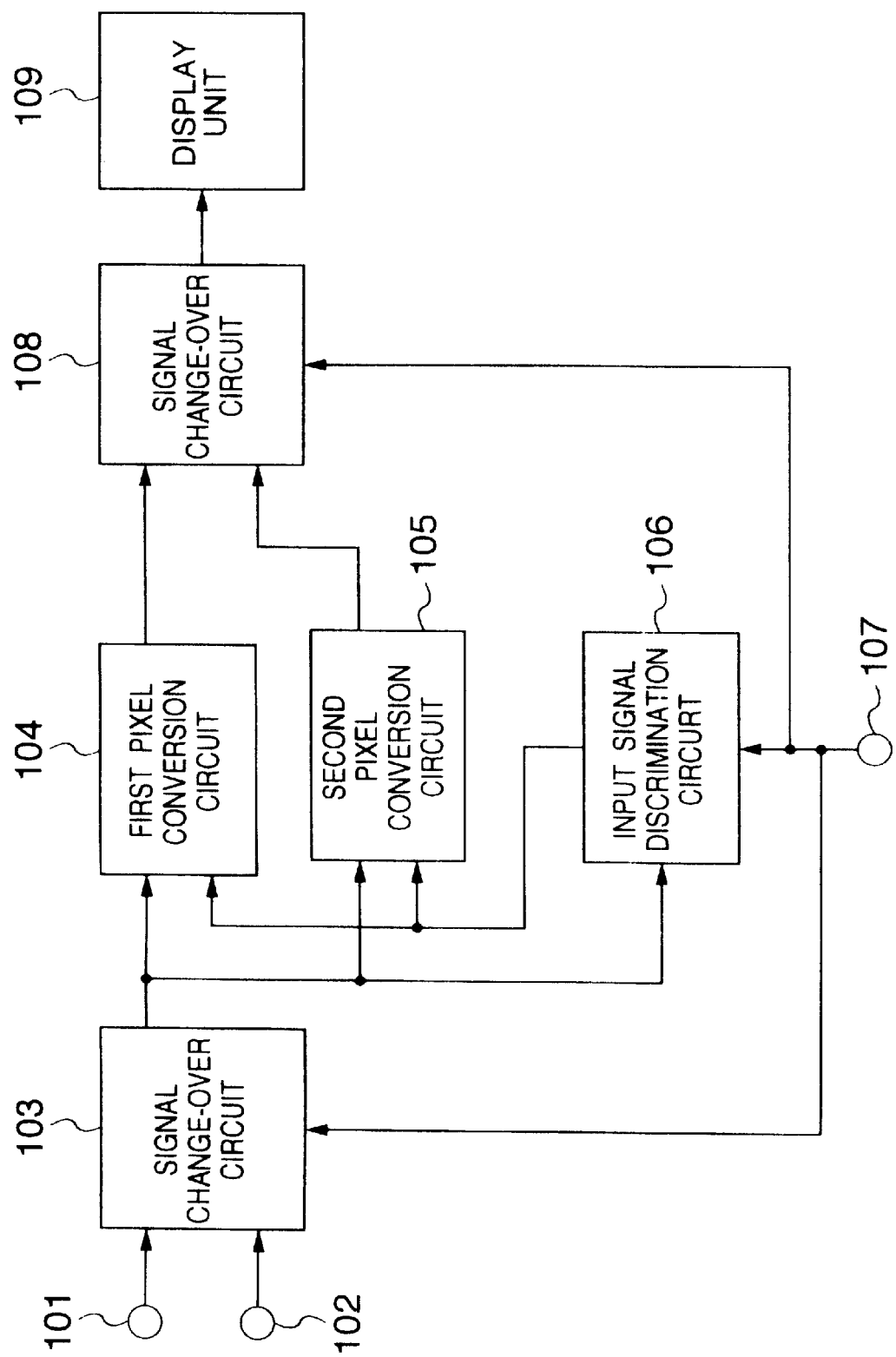
FIG. 1 is a block diagram of the construction of a first embodiment of an image display apparatus according to the invention.

FIG. 1 is a block diagram of the construction of the first embodiment of the image display apparatus according to the invention. Referring to FIG. 1, there are shown a PC signal input terminal 101 to which a signal from a PC is supplied, an EDTV signal input terminal 102 to which an EDTV signal is fed, and a signal change-over circuit 103 for switching between the input image signals and producing a selected signal. The output terminal of the signal change-over circuit 103 is connected to the input terminals of pixel conversion circuits 104, 105 and an input signal discrimination circuit 106. The first pixel conversion circuit 104 and the second pixel conversion circuit 105 constitute a pixel conversion circuitry for converting the number of pixels of the input image signals. The first pixel conversion circuit 104 carries out the pixel conversion in the first conversion mode in which mode a pixel having the same image information (luminance, chromaticity) as that of a certain pixel is inserted as an interpolation pixel so as to be adjacent to the pixel of interest as shown in FIG. 3A. The second pixel conversion circuit 105 carries out the pixel conversion in the second conversion mode in which mode the average of the image information of two adjacent pixels is inserted as an interpolation pixel so as to be between the two adjacent pixels as shown in FIG. 3B. The input signal discrimination circuit 106 identifies the type of the input image signal from the horizontal synchronizing frequency and vertical synchronizing frequency of the input image signal, and sets the magnification factors in the first and second pixel conversion circuits 104, 105. The output terminal from which the input signal discrimination circuit 106 produces the signals for setting the magnification factors is connected to the control terminals of the first and second pixel conversion circuits 104, 105.

The output terminals of the first and second pixel conversion circuits 104, 105 are connected to the two input terminals of another signal change-over circuit 108, respectively. The signal change-over circuit 108 switches between the input signals and produces a selected one. The control terminals of the signal change-over circuits 103, 108 and input signal discrimination circuit 106 are connected to a PC/TV switching signal input terminal 107, to which a PC/TV switching signal is supplied from an operation unit (not shown) which the user operates to select the signal type. The signal change-over circuits 103, 108 selects the PC signal or TV signal in accordance with the PC/TV switching signal, and the input signal discrimination circuit 106 sets the magnification factors of the first and second pixel conversion circuits 104, 105 on the basis of the PC/TV switching signal.

The output terminal of the signal change-over circuit 108 is connected to the input terminal of a display unit 109 which has a TFT liquid crystal panel of, for example, 1024×768 pixels corresponding to XGA mode. The display unit 109 has more pixels than does the NTSC-system equivalent, and thus it is able to display with high quality. In addition, a plasma display panel may used. Also, the display may have 800×600 pixels corresponding to SVGA mode.

The operation of this embodiment will be described below.

The PC signal and EDTV signal input, respectively, from the PC signal input terminal 101 and EDTV signal input terminal 102 are fed to the signal change-over circuit 103, and the signal change-over circuit 103 selects one of the input signals in accordance with the PC/TV switching signal which the user inputted and which is fed from the PC/TV switching signal input terminal 107.

The signal produced from the signal change-over circuit 103 is supplied to the first and second pixel conversion circuits 104, 105, and to the input signal discrimination circuit 106, respectively. The input signal discrimination circuit 106 identifies the type of the input signal according to the horizontal synchronizing frequency and vertical synchronizing frequency of the input signal. The pixel conversion circuits 104, 105 make pixel conversion (magnifies the pixels) of a selected image signal according to the set conversion system in order to fit the number of pixels of the display unit 9 on the basis of the result from the input signal discrimination circuit 106.

When a signal having, for example, 640×480 pixels corresponding to VGA mode (about 31.5 kHz in its horizontal synchronizing frequency, and about 60 Hz in its vertical synchronizing frequency) is applied to the PC signal input terminal 101 in this embodiment shown in FIG. 1, the input signal discrimination circuit 106 recognizes the input image signal as a signal corresponding to VGA from the horizontal and vertical synchronizing frequencies. In addition, the input signal discrimination circuit 106 supplies the control signal for setting the conversion coefficients (magnification factors) to the first and second pixel conversion circuits 104, 105. This control signal causes the conversion coefficients of the first and second pixel conversion circuits 104, 105 to change to the coefficients by which the input image signal can be expanded by 1.5 times in the horizontal and vertical directions as shown in FIG. 4. The first and second pixel conversion circuits 104, 105 convert the input PC signal corresponding to VGA into 960×720 pixels by using the set conversion coefficients. The signal change-over circuit 108 selects the output signal from the first pixel conversion circuit 104 which makes pixel conversion in the first conversion mode shown in FIG. 3A, and supplies it to the display unit 109 in accordance with the PC/TV switching signal fed from the PC/TV switching signal input terminal 107.

Similarly, if the EDTV signal (of about 31.5 kHz in its horizontal synchronizing frequency and about 60 Hz in its vertical synchronizing frequency) is applied to the EDTV input terminal 102 in this embodiment shown in FIG. 1, the input signal discrimination circuit 106 recognizes the input image signal as the signal corresponding to VGA from the horizontal and vertical synchronizing frequencies. In addition, the input signal discrimination circuit 106 supplies the control signal for setting the conversion coefficients (magnification coefficients) to the first and second pixel conversion circuits 104, 105. This control signal makes the first and second pixel conversion circuits 104, 105 be set at the conversion coefficients for magnifying the input image signal by 1.5 times in the horizontal and vertical directions as shown in FIG. 4. The first and second pixel conversion circuits 104, 105 convert the input PC signal corresponding to VGA into 960×720 pixels by using the set conversion coefficients. The signal change-over circuit 108 selects the output signal from the second pixel conversion circuit 105 for making pixel conversion in the second conversion mode shown in FIG. 3B, and supplies it to the display unit 109 in accordance with the PC/TV switching signal from the PC/TV switching signal input terminal 107, While in this embodiment the first and second pixel conversion circuits 104, 105 are separately provided, and switched by the following signal change-over circuit 108, a single pixel conversion circuit may be provided in place of the separate ones, so that the conversion coefficients (magnification factors) can be switched in one conversion circuit, thereby achieving such conversion system as shown in FIGS. 3A and 3B.

[Embodiment 2]

Figure 2:
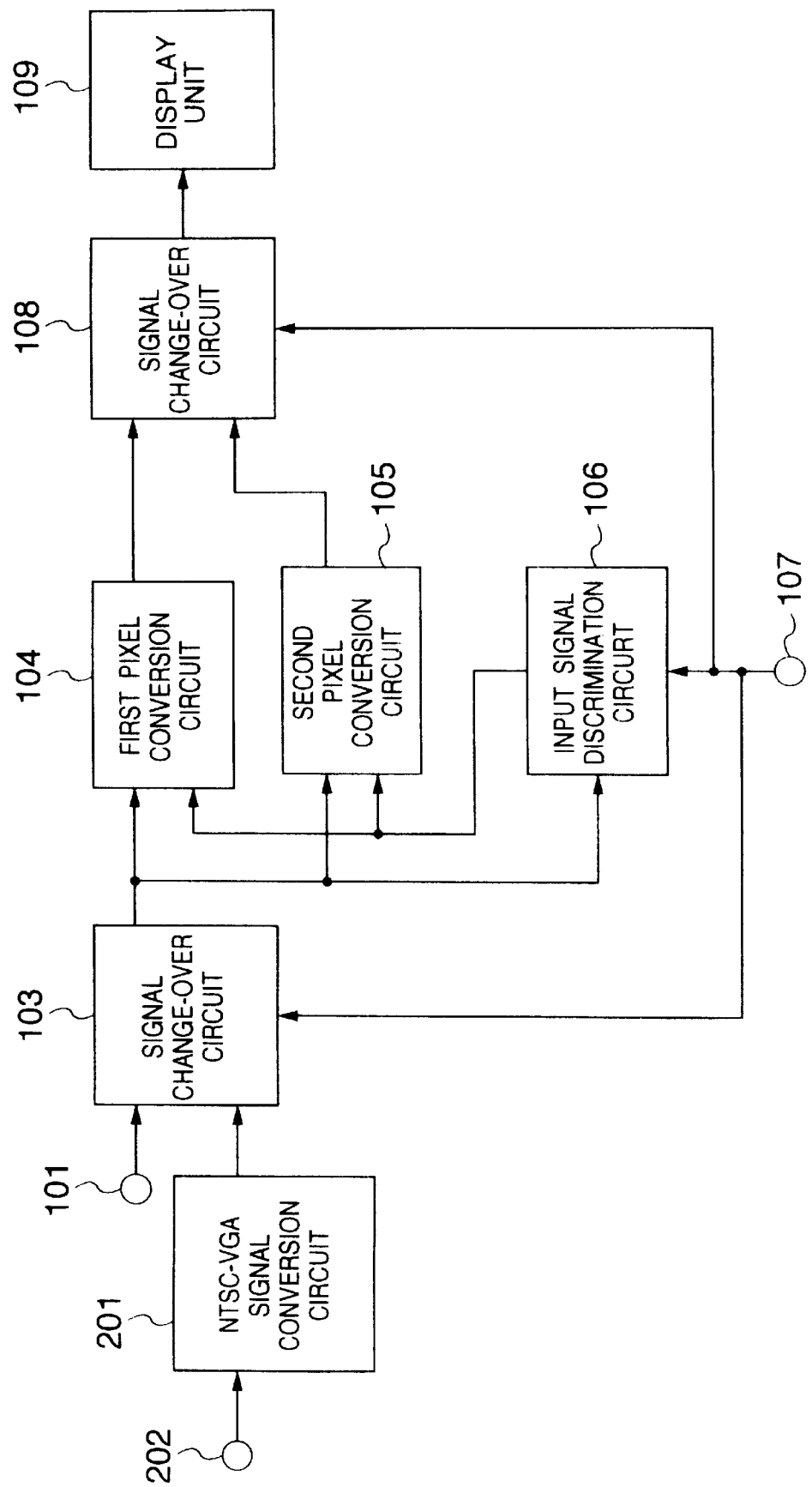
FIG. 2 is a block diagram of the construction of a second embodiment of an image display apparatus according to the invention.

FIG. 2 is a block diagram of the construction of the second embodiment of an image display apparatus according to the invention. In FIG. 2, like elements corresponding to those of the first embodiment shown in FIG. 1 are identified by the same reference numerals, and will not be described.

In this embodiment, the EDTV signal input terminal 102 in the first embodiment is replaced by an input terminal 202 for an NTSC signal (an interlaced signal having a horizontal synchronizing frequency of about 15.75 kHz and a frame frequency of 30 Hz), and an NTSC-VGA signal conversion circuit 201 for converting the NTSC signal into a VGA signal. The NTSC signal input terminal 202 is connected to the input terminal of the NTSC-VGA signal conversion circuit 201. The output terminal of the NTSC-VGA signal conversion circuit 201 is connected to one input terminal of the signal change-over circuit 103.

The NTSC-VGA signal conversion circuit 201 converts the input NTSC signal into a non-interlaced signal which corresponds to a VGA signal and which has a horizontal synchronizing frequency of about 31.5 kHz and a vertical synchronizing frequency of 60 Hz. Thus, the input signal discrimination circuit 106 recognizes this converted signal as a signal corresponding to VGA, and supplies the control signal to the first and second pixel conversion circuits 104, 105 as a signal for setting the conversion coefficients to magnify the input signal by 1.5 times in the horizontal and vertical directions. As a result, the magnification factors of the first and second pixel conversion circuits 104, 105 are set to be 1.5 times, and the pixel conversion can be performed on the basis of this magnification factor. Then, when the signal change-over circuit 108 selects the input PC signal in accordance with the PC/TV switching signal, the output signal from the first pixel conversion circuit 104 for making the pixel conversion in the first conversion mode shown in FIG. 3A is supplied to the display unit 109. When it selects the input NTSC signal, the output signal from the second pixel conversion circuit 105 for making the pixel conversion in the second conversion mode shown in FIG. 3B is transmitted to the display unit 109.

In this embodiment, since the NTSC signal is converted into the non-interlaced signal which has the horizontal and vertical synchronizing frequencies corresponding to a VGA signal, there is no need to provide a plurality of conversion coefficients such as the conversion coefficients for NTSC signal and VGA signal in the first and second pixel conversion circuits 104, 105. Therefore, the first and second pixel conversion circuits 104, 105 can be simplified in their constructions.

This embodiment may be modified so that the conversion coefficients (magnification factors) are switched within one pixel conversion circuit, realizing the conversion systems shown in FIGS. 3A and 3B.

Thus, according to the present invention, even when a plurality of signals of different types are recognized as the same signal type or format by the input signal discrimination circuit, and converted in their pixels by the same conversion coefficient (magnification factor), they can be converted by the optimum conversion system suitable for each of the PC signal and TV signal so that high-quality pictures can be obtained.

What is claimed is:

1. An image display apparatus capable of receiving, as an image signal thereof, a PC signal from a personal computer and a television signal and magnifying at least one of said PC signal and television signal for display on a display unit, comprising:

a pixel conversion circuit having a first conversion mode and a second conversion mode, said first conversion mode inserting into an image signal a pixel for interpolation having same image information as that of a pixel in said image signal to convert pixel number of said image signal and said second conversion mode inserting into an image signal a pixel for interpolation having image information of both of adjacent two pixels in the image signal to convert pixel number of said image signal; and a signal change-over circuit connected to an output of said pixel conversion circuit and to an input of said display unit, said signal change-over circuit supplying to said display unit a PC signal whose pixel number has been converted in said first conversion mode when the signal inputted to said image display apparatus is a PC signal and supplying to said display unit a television signal whose pixel number has been converted in said second conversion mode when the signal inputted to said image display apparatus is a television signal.

2. An image display apparatus according to claim 1, wherein said display unit has more pixels than the number of pixels than the numbers of said input PC signal and said television signal.

3. An image display apparatus capable of receiving, as an image signal, a PC signal from a personal computer and a television signal and magnifying at least one of said PC signal and television signal for display on a display unit, comprising:

a first pixel conversion circuit which generates a first conversion signal by inserting into an image signal a pixel for interpolation having same image information as that of a pixel in said image signal;

a second pixel conversion circuit which generates a second conversion signal by inserting into an image signal a pixel for interpolation having image information of both of two adjacent pixels in said image signal; and a signal change-over circuit connected to outputs of said first and second pixel conversion circuits and to an input of said display unit, said signal change-over circuit supplying to said display unit a first conversion signal output from said first pixel conversion circuit to said display unit when the signal inputted to said image display apparatus is a PC signal and supplying to said display unit a second conversion signal outputted from said second pixel conversion circuit when the signal inputted to said image display apparatus is a television signal.

4. An image display apparatus capable of receiving, as an image signal, a PC signal from a personal computer and a television signal, comprising:

a display unit;

a first input terminal which receives said PC signal;

a second input terminal which receives said television signal;

a first pixel conversion circuit which generates a first conversion signal by inserting into an image signal a pixel for interpolation having same image information as that of a pixel for interpolation having same image information as that of a pixel in said image signal;

a second pixel conversion circuit which generates a second conversion signal by inserting into an image signal a pixel for interpolation having image information of both of two adjacent pixels in said image signal; and a signal change-over circuit connected to outputs of said first and second pixel conversion circuits and to an input of said display unit, said signal change-over circuit supplying to said display unit a first conversion signal output from said first pixel conversion circuit when the signal inputted to said image display apparatus is a PC signal and supplying to said display unit a second conversion signal outputted from said second pixel conversion circuit when the signal inputted to said image display apparatus is a television signal.

5. An image display apparatus according to claim 1, wherein in accordance with user's operation, said signal change-over circuit selects one of said PC signal whose pixel number has been converted in said first conversion mode and said television signal whose pixel number has been converted in said second mode.

6. An image display apparatus according to claim 1, further comprising an input signal discrimination circuit which determines whether the inputted signal is a PC signal or a television signal, and said input signal discrimination circuit sets conversion coefficients used in said first and second conversion modes in accordance with a discrimination result.

7. An image display apparatus capable of receiving, as an image signal, a PC signal from a personal computer and a television signal comprising:

a display unit;

a first input terminal to which said PC signal is applied;

a second input terminal to which said television signal is applied;

a pixel conversion circuit having a first conversion mode and a second conversion mode, said first conversion mode inserting into an image signal a pixel for interpolation having same image information as that of a pixel in said image signal to convert pixel number of said image signal and said second conversion mode inserting into an image signal a pixel for interpolation having image information of both of adjacent two pixels in the image signal to convert pixel number of said image signal; and a signal change-over circuit connected to an output of said pixel conversion circuit and to an input of said display unit, said signal change-over circuit supplying to said display unit a PC signal whose pixel number has been converted in said first conversion mode when the signal inputted to said image display apparatus is a PC signal and supplying to said display unit a television signal whose pixel number has been converted in said second conversion mode when the signal inputted to said image display apparatus is a television signal.

8. An image display apparatus according to claim 7, wherein said display unit has more pixels than the pixel number of said received image signal.

9. An image display apparatus according to claim 7, wherein said signal change-over circuit selects one of said PC signal whose pixel number has been converted in said first conversion mode and said television signal whose pixel number has been changed in said second conversion mode in accordance with user's operation.

10. An image display apparatus according to claim 7, further comprising an input signal discrimination circuit which determines whether the inputted signal is a PC signal or a television signal, and said input signal discrimination circuit sets conversion coefficients used in said first and second conversion modes in accordance with a discrimination result.

11. An image display apparatus according to claim 7, further comprising a conversion circuitry which is connected to said second input terminal and converts a television signal input to said second input terminal to a signal of same type as that of a PC signal inputted to said first input terminal and supplies the converted television signal to said pixel conversion circuit.

12. An image display apparatus according to claim 11, wherein said television signal is is a NTSC television signal and said PC signal is a signal of VGA type, said conversion circuitry converts said NTSC television signal to said signal of VGA type.

13. An image display apparatus, comprising:

a display device;

a first input terminal to which a PC signal from a personal computer is applied;

a second input terminal to which a television signal is applied;

a third input terminal to which a change-over signal signal is applied;

a first signal change-over circuit connected to said first, second and third input terminals which outputs a PC signal inputted to said first input terminal when the change-over signal applied to said third input terminal is a PC signal selection signal and outputs a television signal inputted to said second input terminal when the change-over signal applied to said third input terminal is television signal selection signal;

a first pixel conversion circuit which inserts a pixel for interpolation having same image information as that of a certain pixel in a signal from said first change-over circuit so as to be adjacent to said certain pixel to generate a first conversion signal;

a second pixel conversion circuit which inserts a pixel for interpolation which has average image information of two adjacent pixels in a signal from said first change-over circuit so as to be between said two adjacent pixels to generate a second conversion signal; and a second signal change-over circuit connected to an output of said first pixel conversion circuit, an output of said second pixel conversion circuit, said third input terminal and an input of said display unit, said second signal change-over circuit supplying to said display unit said first conversion signal outputted from said first pixel conversion circuit when the change-over signal applied to said third input terminal is a PC signal selection signal and supplying to said display unit said second conversion signal outputted from said second pixel conversion circuit when the change-over signal is a television signal selection signal.

14. An image display apparatus according to claim 13, further comprising an input signal discrimination circuit which determines whether an input signal is a PC signal or a television signal, and said input signal discrimination circuit sets conversion coefficients used by said first and second pixel conversion circuits when executing pixel conversion in said first and second pixel conversion circuits in accordance with a discrimination result.

15. An image display apparatus according to claim 13, further comprising a third conversion circuit connected to said second input terminal and to said first change-over circuit which converts the television signal applied to said second input terminal to a signal of same type as that of the PC signal applied to said first input terminal and feeds the converted signal to said first change-over circuit.

16. An image display apparatus according to claim 15, wherein said television signal is a television signal of NTSC format and said PC signal is a signal of VGA type, said third conversion circuit converts said television signal of NTSC format to said PC signal of VGA type.

* * * * *